United States Patent
Holtslag

(10) Patent No.: US 6,856,328 B2
(45) Date of Patent: Feb. 15, 2005

(54) SYSTEM AND METHOD OF DISPLAYING IMAGES

(75) Inventor: Antonius Hendricus Maria Holtslag, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 200 days.

(21) Appl. No.: 10/043,385

(22) Filed: Oct. 26, 2001

(65) Prior Publication Data

US 2002/0130892 A1 Sep. 19, 2002

(30) Foreign Application Priority Data

Oct. 31, 2000 (EP) .............................................. 00203789

(51) Int. Cl.$^7$ ................................................. G09G 3/28
(52) U.S. Cl. ......................................... 345/690; 345/63
(58) Field of Search ................................ 345/207, 690, 345/63, 77; 348/631; 382/116, 232, 233

(56) References Cited

U.S. PATENT DOCUMENTS

| 4,608,601 | A | * | 8/1986 | Shreck et al. | ................ 348/473 |
| 5,349,390 | A | | 9/1994 | Stessen et al. | ............... 348/679 |
| 5,771,307 | A | * | 6/1998 | Lu et al. | ...................... 382/116 |
| 5,953,456 | A | * | 9/1999 | Ikeda et al. | .................. 382/232 |
| 5,990,978 | A | * | 11/1999 | Kim et al. | .................... 348/663 |
| 5,999,162 | A | * | 12/1999 | Takahashi et al. | ........ 345/440.1 |
| 6,125,145 | A | * | 9/2000 | Koyanagi et al. | ....... 375/240.16 |
| 6,504,992 | B1 | * | 1/2003 | Minabe et al. | ................. 386/68 |
| 6,507,368 | B1 | * | 1/2003 | Sakashita | ..................... 348/448 |
| 2004/0113926 | A1 | * | 6/2004 | Liaw | ........................... 345/690 |

FOREIGN PATENT DOCUMENTS

| EP | 0354518 A2 | 2/1990 | |
| EP | 0 907 098 A1 | * 1/1998 | ........... G03B/17/20 |
| EP | 0589513 | 12/1998 | ............ H04N/5/57 |
| JP | 09284648 A | 10/1997 | |

* cited by examiner

Primary Examiner—Amare Mengistu
(74) Attorney, Agent, or Firm—Edward W. Goodman

(57) ABSTRACT

Logos may be present in images transmitted by television stations. These logos are often present in the corners (102, 104) of an image (100) for a long time. They do not move and may comprise saturated colors. This results in burn-in effects in emissive displays because the logos provide the same display load at the same location for a relatively long period of time. The burn-in effect can be prevented by detecting the logos in the corners (102, 104) of the image (100) and reducing their intensity to the average display load.

10 Claims, 2 Drawing Sheets

SYSTEM AND METHOD OF DISPLAYING IMAGES

BACKGROUND OF THE INVENTION

1. Field of the Invention

The invention relates to a system for displaying an image, the system being provided with selection means for selecting an area within the image, and reduction means for reducing a light intensity of the image.

The invention also relates to a method of displaying an image, the method comprising the steps of selecting an area within the image, and reducing the light intensity of the image.

2. Description of the Related Art

Such a system and method are known from European Patent Application No. EP-B-0 589 513, corresponding to U.S. Pat. No. 5,349,390, describing a number of light intensity-reducing functions protecting the processors and the display tube of television receivers from overload. The image quality is enhanced by these functions and the lifetime of the display tube is extended. A first light intensity-reducing function acts on larger areas, such as persons' faces, and is performed when the period during which the image signal in these areas exceeds a first threshold value, is longer than a given minimal period of time. This function reduces the light intensity of the entire image. The second intensity-reducing function is performed instantly when the maximally allowed amplitude of the image signal is exceeded. This second function reduces the light intensity locally. Both functions are only effective if the image signal exceeds given threshold values. However, practice has proved that there are parts of the image which may reduce the lifetime of a display tube, in spite of the fact that they do not exceed the threshold values.

SUMMARY OF THE INVENTION

It is an object of the invention to provide a system of the type described in the opening paragraph, in which the light intensity can be reduced independently of the intensity of the image signal for given parts of the image which may reduce the lifetime of a display tube. To this end, the system according to the invention, is characterized in that the system is further provided with a motion detector for detecting motion in a stationary part within the area, and in that the reduction means reduces the light intensity of the stationary part within the area when motion has also been detected within the area. A typical example of a harmful stationary part is a logo which is present in the image for a longer period of time and often comprises saturated colors. An example of a harmless stationary part is, for example, a wall. Such a wall does not need to be reduced in intensity. To be able to prevent this, it may first be determined whether motion is detected within the area before a stationary part such as, for example, the previously mentioned logo, is searched. It can thus be prevented that a stationary background is reduced in intensity while only the logo must be reduced in intensity.

In an embodiment of the system according to the invention, the system further comprises a first memory for storing a running average of a quantity of motion in the area. An image comprises a plurality of pixels. In, for example, video, a plurality of images is shown one after the other. By subtracting the pixel values of a pixel in, for example, consecutive images, a quantity of motion of that pixel can be determined. A running average may be obtained, for example, by computing this quantity of motion for a plurality of consecutive images and by dividing this quantity by the number of computations. A "moving" pixel is then a pixel whose value has great differences between consecutive images, which yields a high running average. For a "stationary" pixel, the running average is thus low.

In an embodiment of the system according to the invention, the system further comprises a second memory for storing a predetermined criterion with which the running average must comply so as to distinguish the stationary part from the moving part within the area. Due to an inaccuracy in a pixel signal, referred to as noise, the running average of a "stationary" pixel will never be exactly zero. To correct this, the criterion may hold, for example, that the running average of a "stationary" pixel does not exceed a predetermined maximum value. When this maximum value is exceeded, it is not a "stationary" pixel. This has the advantage that a correction can be made for the quantity of noise in the pixel signal, because much noise is allowed at a predetermined high maximum value and little or even no noise is allowed in the pixel signal at a predetermined low maximum value.

In an embodiment of the system according to the invention, the system further comprises a third memory for storing a predetermined minimal period of time during which the stationary part must comply with the criterion. A stationary part, such a logo, may be harmful if it is present at the same location in an image for a longer period of time. Only when the stationary part is present during this predetermined minimum period of time can the stationary part be reduced in intensity. This has the advantage that it may take some time before the stationary part is reduced in intensity. Stationary parts which are present for only a short time, and are thus harmless or less harmful, will then not be reduced in intensity so that a quieter picture can be displayed.

In an embodiment of the system according to the invention, the reduction means stepwise reduces the light intensity. It is not necessary that a stationary part is reduced in intensity in one step, because this is quite visible and will probably be noticed by the viewer. By reducing the intensity in a plurality of smaller steps, the same reduction can be obtained while the viewer will notice this to a lesser extent.

It is a further object of the invention to provide a method as described in the opening paragraph, in which the light intensity can be reduced independently of the image signal. To this end, the method according to the invention is characterized in that it further comprises a step of detecting motion and a stationary part within the area, and in that the reduction step is performed for the stationary part if motion is also detected within the area.

These and other aspects of the invention are apparent from and will be elucidated with reference to the embodiments described hereinafter.

DESCRIPTION OF THE PREFERRED EMBODIMENTS

Figure 1:
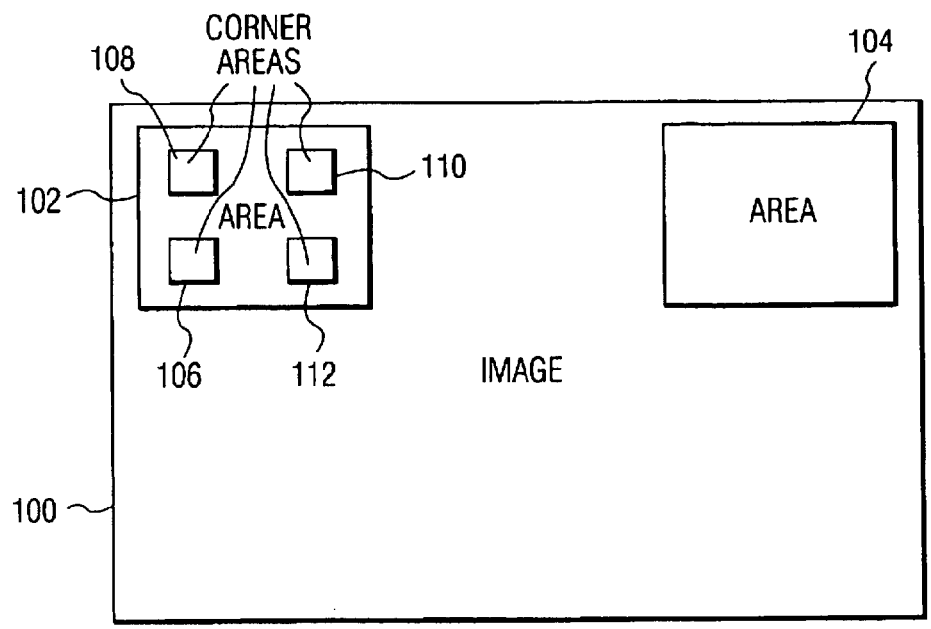
FIG. 1 shows an example of the position of areas in an image within which the intensity can be reduced.

FIG. 1 shows an example of a display screen displaying an image 100 showing positions of areas 102 and 104 within which the intensity can be reduced. Stationary objects, such as logos, are often displayed in a corner of the image because they cover the image at that area to a minimal extent. To be able to detect these logos, it is useful to search for stationary object in the corners of the image. The areas 102 and 104 are therefore positioned in the corners of the image 100 but, in principle, they may be positioned anywhere on the image or even move across the image and regularly reach a different position. Furthermore, logos are generally not so large: on a 28 inch display, they are often smaller than 3-by-3 cm. It is thus sufficient to search for motion in relatively small areas of, for example, 50-by-50 pixels. The number of areas within which logos can be detected may vary. For example, the image may be entirely divided into small areas within which motion is searched. The areas need not be squares and may also be larger or smaller. Motion may be determined in the corners 106, 108, 110 and 112 within the areas 102 and 104.

Figure 2:
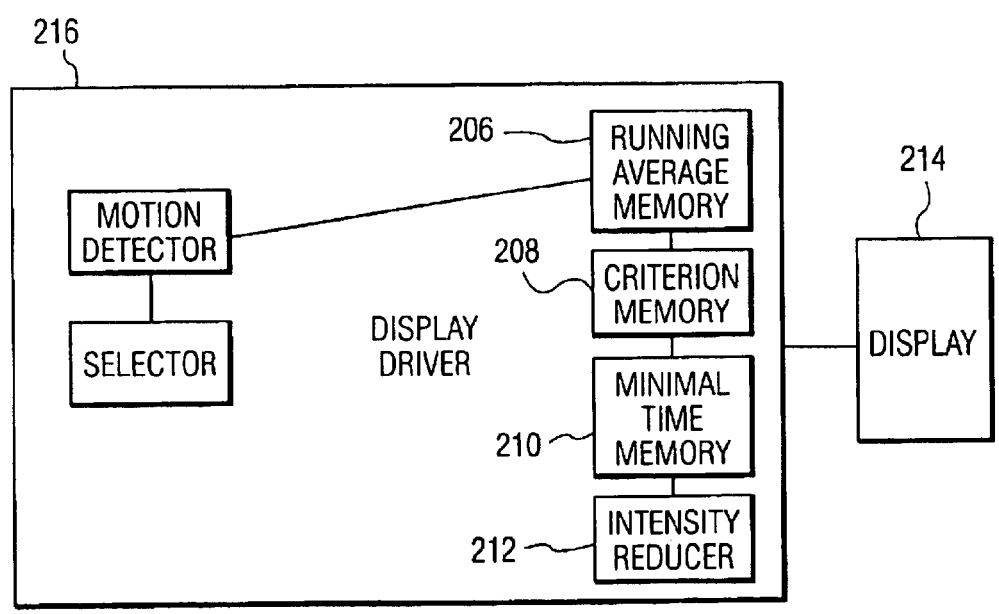
FIG. 2 shows, diagrammatically, the most important parts of a system for reducing the intensity according to the invention.

FIG. 2 shows, diagrammatically, the most important parts of a system for reducing the intensity according to the invention. A selection means 202 positions the areas 102 and 104 in the images, the logos detectable within the areas 102 and 104. A motion detector 204 detects motion within the areas 102 and 104 within the image 100. It is not necessary to detect the entire area. It is generally sufficient to detect motion only in the corners 106, 108, 110 and 112. Memory space can thus be saved.

An image consists of pixels and each pixel has three different values, one for each color: "$Pixel_R$" is the red value of the pixel, "$Pixel_G$" is the green value of the pixel and "$Pixel_B$" is the blue value of the pixel. A quantity of motion of a pixel, here referred to by "$Pixel_{motion_{R,G,B}}$" is computed by subtracting the pixel values of a pixel of consecutive images, here denoted by "$Pixel_{old}$" and "$Pixel_{new}$," and by taking their absolute value:

$Pixel_{motion_{R,G,B}} = <Pixel_{motion_R}, Pixel_{motion_G}, Pixel_{motion_B}>$
$Pixel_{motion_R} = |Pixel_{old_R} - Pixel_{new_R}|$
$Pixel_{motion_G} = |Pixel_{old_G} - Pixel_{new_G}|$
$Pixel_{motion_B} = |Pixel_{old_B} - Pixel_{new_B}|$ The quantity of motion thus computed per pixel may, however, also be computed by means of, for example, a commercially available motion detector.

A running average per pixel "$Pixel_{average_{R,G,B}}$", stored in a memory 206, is obtained by computing the quantity of motion for a given number of consecutive images, adding them per color and dividing them by the number of computations:

$Pixel_{average_{R,G,B}} = <Pixel_{average_R}, Pixel_{average_G}, Pixel_{average_B}>$ $$Pixel_{average_{R_{new}}} = \frac{(Pixel_{average_{R_{old}}} * (\# computations - 2))}{(\# computations - 1)} + Pixel_{motion_R}$$

$$Pixel_{average_{G_{new}}} = \frac{(Pixel_{average_{G_{old}}} * (\# computations - 2))}{(\# computations - 1)} + Pixel_{motion_G}$$

$$Pixel_{average_{B_{new}}} = \frac{(Pixel_{average_{B_{old}}} * (\# computations - 2))}{(\# computations - 1)} + Pixel_{motion_B}$$

Here, "$Pixel_{average_{new}}$" is a new running average of the computed quantity of motion, "$Pixel_{average_{old}}$" is an old running average of the computed quantity of motion and "#computations" is a number of computations that has been performed. If a pixel belongs to a logo, this pixel has a low value in the memory 206 because this pixel has a low running average. This is because the result of subtracting two pixels whose values are the same or almost the same is approximately zero. If a pixel does not belong to a logo, this pixel has a high value in the memory 206 because this pixel has a high running average. This is because the result of subtracting two pixels whose values differ considerably has a high value. Due to inaccuracies in the pixel signal, referred to as noise, the running average for a pixel will hardly ever be exactly zero. For this reason, a memory 208 has been added which stores a criterion with which the running average of a pixel must comply so as to belong to a logo. This criterion may be, for example, that the running average of a "stationary" pixel does not exceed a predetermined maximum value. When this maximum value is exceeded, it is no longer considered a "stationary" pixel and the pixel does not belong to a logo. It can thus also be prevented that pixels which do not belong to a logo are nevertheless considered to belong to the logo. This criterion may also include a number of known logos, which are known in advance, and with which the "stationary" pixels can be compared.

The use of the running average also has some drawbacks: first, a logo which has been present for a longer period of time and disappears at a given moment will still be detected for a number of periods. Secondly, it takes a number of periods before a logo is detected if there has been no logo for a longer period of time. This may be prevented, for example, by correcting the previously computed running average of a pixel, "$Pixel_{average_{old}}$", and the currently computed motion of a pixel "$Pixel_{motion}$", on the basis of:

the previously computed running average of a pixel ($Pixel_{average_{old}}$),
the previously computed motion of a pixel ($Pixel_{motion_{old}}$), and
the currently computed motion of a pixel ($Pixel_{motion}$).

The correction is effected, for example, on the basis of the following Table in which "MaxDev" is the criterion as is stored in the memory 208 and "-" indicates that the value is not adapted.

| Old value | | | New value | |
|---|---|---|---|---|
| $Pixel_{average_{old}}$ | $Pixel_{motion_{old}}$ | $Pixel_{motion}$ | $Pixel_{average_{old}}$ | $Pixel_{motion}$ |
| <= MaxDev/2 | <= MaxDev/2 | <= MaxDev/2 | 0 | 0 |
| > MaxDev | <= MaxDev/2 | <= MaxDev/2 | MaxDev | 0 |
| <= MaxDev/2 | > MaxDev | <= MaxDev/2 | MaxDev | 0 |
| > MaxDev | > MaxDev | <= MaxDev/2 | — | MaxDev |
| <= MaxDev/2 | <= MaxDev/2 | > MaxDev | — | MaxDev |
| > MaxDev | <= MaxDev/2 | > MaxDev | — | MaxDev |
| <= MaxDev/2 | > MaxDev | > MaxDev | MaxDev + 1 | MaxDev + 1 |
| > MaxDev | > MaxDev | > MaxDev | 255 | 255 |

A disappearing or appearing logo can be detected at an earlier instant by means of the corrections as indicated in the Table.

One of the characteristic features of a logo is that it must be present for a longer period of time, for example, 15 minutes to cause harmful effects for the display tube. The harmful effects may be caused because logos may comprise saturated colors and produce the same display load at the position of the logo. The minimal period of time is stored in a memory 210. If a logo is detected during this minimal period of time, the intensity of the logo may be reduced. To obtain a maximally uniform load on the display tube, the intensity of the logo may be reduced to such an extent that the average display load of the logo is substantially equal to the average display load of the images in which the logo has been detected.

It is not necessary that the logo be reduced in intensity in one step, because this is quite visible and will probably be noticed by the viewer. For this reason, a reduction means 212 is preferably adapted in such a way that it reduces the intensity little-by-little in a plurality of steps until the average display load of the logo is equal to the average display load of the image. When a logo comprises saturated colors, for example, only these saturated colors can be reduced in intensity. The logo may fall partly beyond the areas 102 and 104 so that it can only be partly reduced in intensity. In that case, a number of pixels of the logo overlap the edges of the areas 102 and 104, and the areas 102 and 104 may be enlarged until there are no longer any "logo" pixels which overlap the edges of the areas 102 and 104. The entire logo can thus still be reduced in intensity.

The components described in this embodiment are added to a known system 216 for driving a plasma display 214. Also, other displays such as, for example, CRTs, PDPs and PLED, can be driven with this system.

Figure 3:
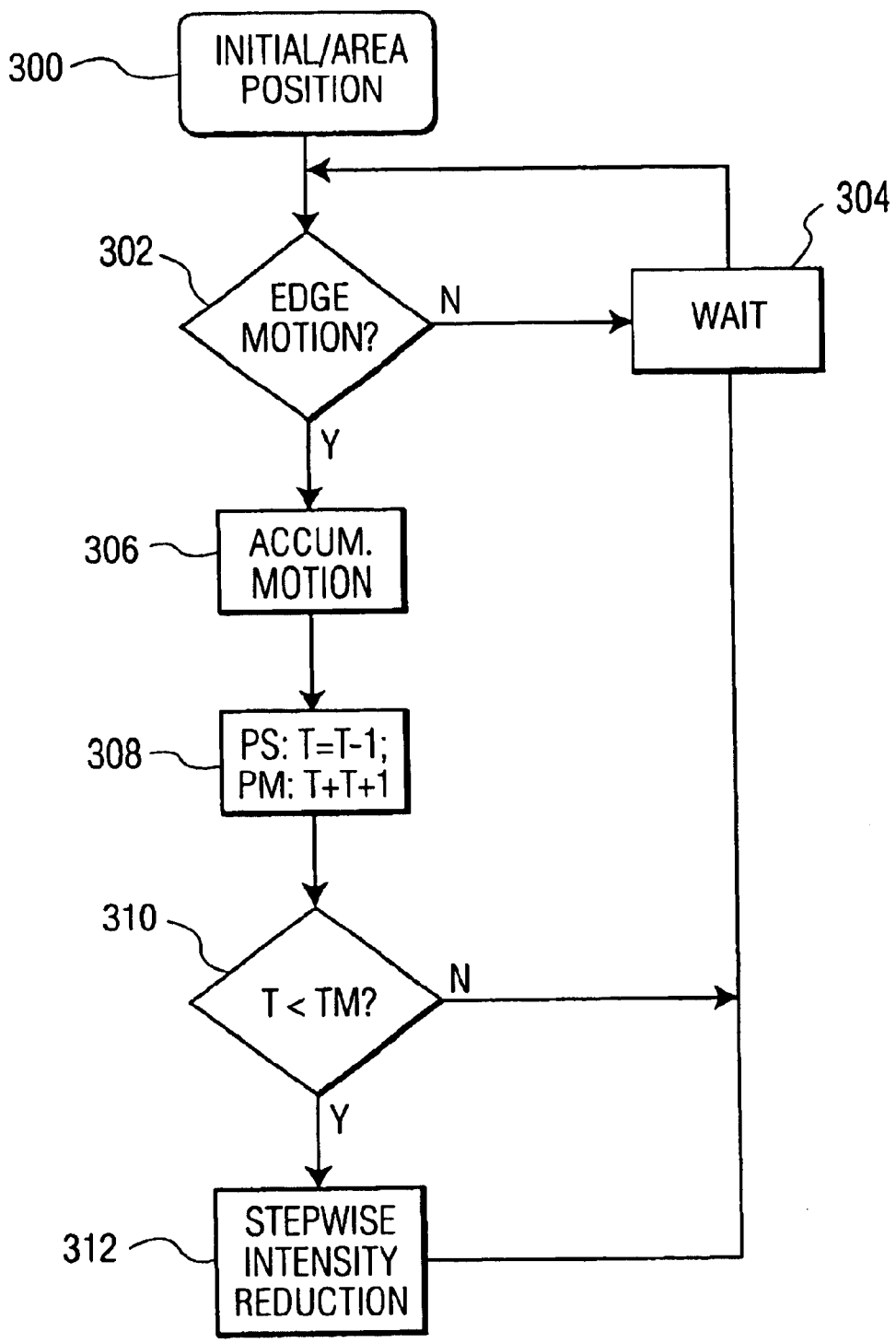
FIG. 3 is a flowchart showing the main steps of a method of reducing the intensity according to the invention.

FIG. 3 is a flowchart showing the main steps of the method of reducing the intensity according to the invention. Step 300 is an initialization step and comprises positioning of an area in an image, an initialization of a running average for all pixels within the area and initialization of a number of units of time when a pixel is stationary. In step 302, it is determined, in the manner described hereinbefore, whether there is motion at the edge of the area. When this is not the case, a predetermined waiting time is observed in step 304 before returning to step 302. When there is motion, a quantity of motion is detected and added per pixel within the area, in step 306, in the previously described manner, to a previous value of the running average for this pixel. When this running average complies, in step 308, with a previously mentioned criterion, the pixel is deemed "stationary" (PS) and the number of units of time when the running average complies with the criterion is raised by 1 (T=T+1). When the running average in step 308 does not comply with the previously mentioned criterion, the pixel "moves" (PM) and the number of units of time the running average complies with the criterion is lowered by 1 if the number of units of time was larger than 0 (T=T−1). In the next step 310, it is checked whether the number of units of time complies with a minimal period of time (TM) when the pixel must be stationary. When the number of units of time does not comply with this, one proceeds to step 304. When the number complies with the minimal period of time when the pixel must be stationary, the light intensity of the pixel is stepwise reduced in step 312 if the light intensity was not as yet reduced, whereafter, one proceeds to step 304.

What is claimed is:

1. A system for displaying an image, said system comprising:

a selection means for selecting an area within the image; and reduction means for reducing a light intensity of the image, characterized in that the system further comprises:

a motion detector for detecting motion and a stationary part within the image; and wherein the reduction means reduces the light intensity of the stationary part within the area if motion has also been detected within the area.

2. The system as claimed in claim 1, wherein the system further comprises:

a first memory for storing a running average of a quantity of motion in the area.

3. The system as claimed in claim 2, wherein the system further comprises:

a second memory having stored therein a predetermined criterion with which the running average must comply so as to distinguish the stationary part from the moving part within the area.

4. The system as claimed in claim 3, wherein the system further comprises:

a third memory having stored therein a predetermined minimal period of time during which the stationary part must comply with the criterion.

5. The system as claimed in claim 1, wherein the reduction means stepwise reduces the light intensity.

6. A method of displaying an image, wherein the method comprises the steps:

selecting an area within the image; and reducing a light intensity of the image, characterized in that the method further comprises the step detecting motion in a stationary part within the image, and wherein the reduction step is performed for the stationary part if motion is also detected within the area.

7. The method as claimed in claim 6, wherein the method further comprises the step:

determining a running average of the quantity of motion within the area.

8. The method as claimed in claim 7, wherein the method further comprises the step:

distinguishing the stationary part from the moving part within the area if the running average complies with a predetermined criterion.

9. The method as claimed in claim 8, wherein the method further comprises the step:

determining whether the stationary part complies with the criterion during a predetermined minimal period of time.

10. The method as claimed in claim 6, wherein the method further comprises the step:

stepwise reducing the light intensity.

* * * * *